INVENTOR.
RICHARD C. STANLEY
BY
Kimmel & Crowell
ATTORNEYS

Jan. 1, 1963 R. C. STANLEY 3,071,107
PIPE COATING APPARATUS
Filed Sept. 29, 1960 4 Sheets-Sheet 2

INVENTOR.
RICHARD C. STANLEY
BY
Kimmel & Crowell
ATTORNEYS

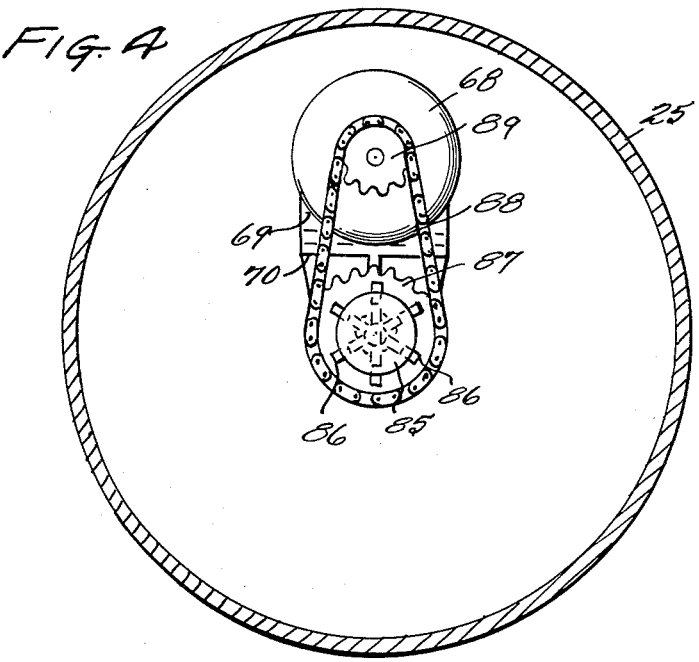
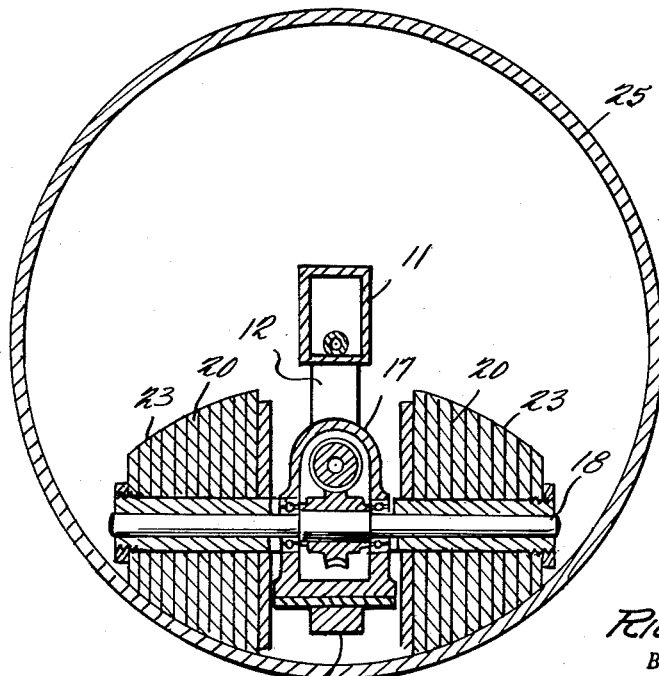

Jan. 1, 1963   R. C. STANLEY   3,071,107
PIPE COATING APPARATUS

Filed Sept. 29, 1960   4 Sheets-Sheet 4

INVENTOR.
RICHARD C. STANLEY
BY
Kimmel & Crowell
ATTORNEYS

United States Patent Office 3,071,107
Patented Jan. 1, 1963

3,071,107
PIPE COATING APPARATUS
Richard C. Stanley, 2602 S. 11th St., Gadsden, Ala.
Filed Sept. 29, 1960, Ser. No. 59,311
3 Claims. (Cl. 118—306)

This invention relates to a pipe coating apparatus, and has particular applicability to machines for coating the interiors of pipes of relatively large diameter.

A primary object of the invention is the provision of an improved self-propelled machine which will completely paint the interior of a relatively large diameter pipe with a uniform thickness coating of paint or the like.

An additional object of the invention is the provision of such a device which is adapted to travel completely through the pipe to be painted, and upon reversal of its direction of travel, will travel backward through the pipe coating the inside surface as it returns from the far end of the pipe.

Still another object of the invention is the provision of an apparatus of this character which includes a power driven rotatable nozzle which coats the internal surface evenly and uniformly as it rotates.

A further object of the invention is the provision, in a device of this character, of high pressure pump means to force the paint through the nozzle and eliminate the possibility of air bubbles or the like.

A more specific object of the invention is the provision of a rotatable unit to provide for rotation of the nozzle without leakage under conditions of high pressure.

A further specific object of the invention is the provision of relatively large diameter rubber rolls driven through reducing gears for driving the device, preventing the machine from turning inside of the pipe.

A further object of the invention is the provision of pneumatically-tired idler wheels to center and provide extra support for the frame of the device internally of the pipe.

A further important object of the invention is the provision of adjustment means which will permit either horizontal or vertical adjustment of the nozzle, to keep the paint nozzle centered in the pipe.

Still another object of the invention is the provision of an apparatus of this character which is sturdy and durable in construction, reliable and efficient in operation and relatively simple and inexpensive to manufacture, assemble and utilize.

Still other objects reside in the combination of elements, arrangements of parts, and features of construction, all as will be more fully pointed out hereinafter and disclosed in the accompanying drawings wherein:

FIGURE 4 is a sectional view taken substantially along the line 4—4 of FIG. 1 as viewed in the direction indicated by the arrows.

FIGURE 5 is a sectional view taken substantially along the line 5—5 of FIG. 1 as viewed in the direction indicated by the arrows.

Similar reference characters refer to similar parts throughout the several views of the drawing.

Having reference now to the drawings in detail, the device of the instant invention, generally indicated at 10, includes a centrally positioned hollow frame member 11, which may be of rectangular cross-section, or any other desired configuration.

Figure 3:
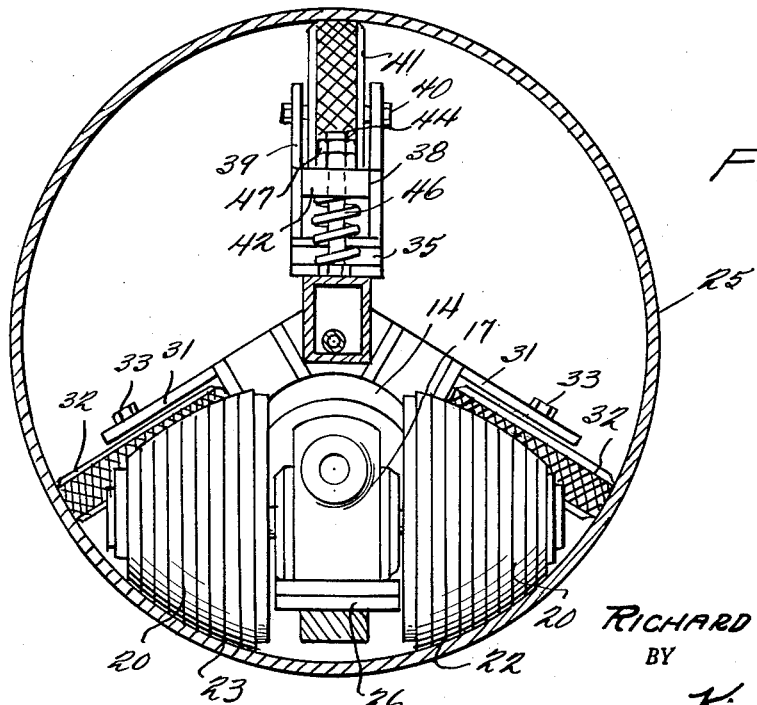
FIGURE 3 is a sectional view taken substantially along the line 3—3 of FIG. 2 as viewed in the direction indicated by the arrows.
Figure 6:
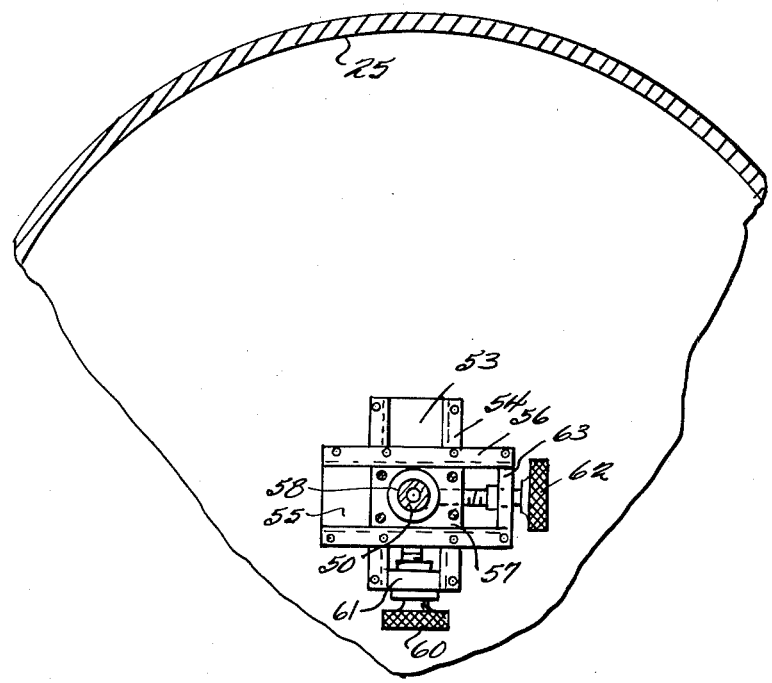
FIGURE 6 is an enlarged fragmentary sectional view taken substantially along the line 6—6 of FIG. 1 as viewed in the direction indicated by the arrows.

A web or fin 12 is firmly secured to the underside of the member 11, and terminates at its lower end in a plate 13, upon which is mounted an electric motor 14. The drive shaft 15 of motor 14 drives, through a clutch 16, a conventional gear reduction box 17, which is provided with oppositely disposed power shafts 18 to which are secured power rollers 20. The power rollers are each comprised, as best shown in FIG. 3, of a series of semi-resilient discs 22, which may be comprised of hard rubber or the like, and which diminish in diameter progressively away from the gear reduction box, to form an arcuate outer surface 23, which is adapted to engage on the lower inner surface of the pipe 25 to be coated. The lower plate 13 includes an offset portion 26, and terminates in lower section 27 upon which a centrally positioned gear reduction box 17 is mounted.

Figure 1:
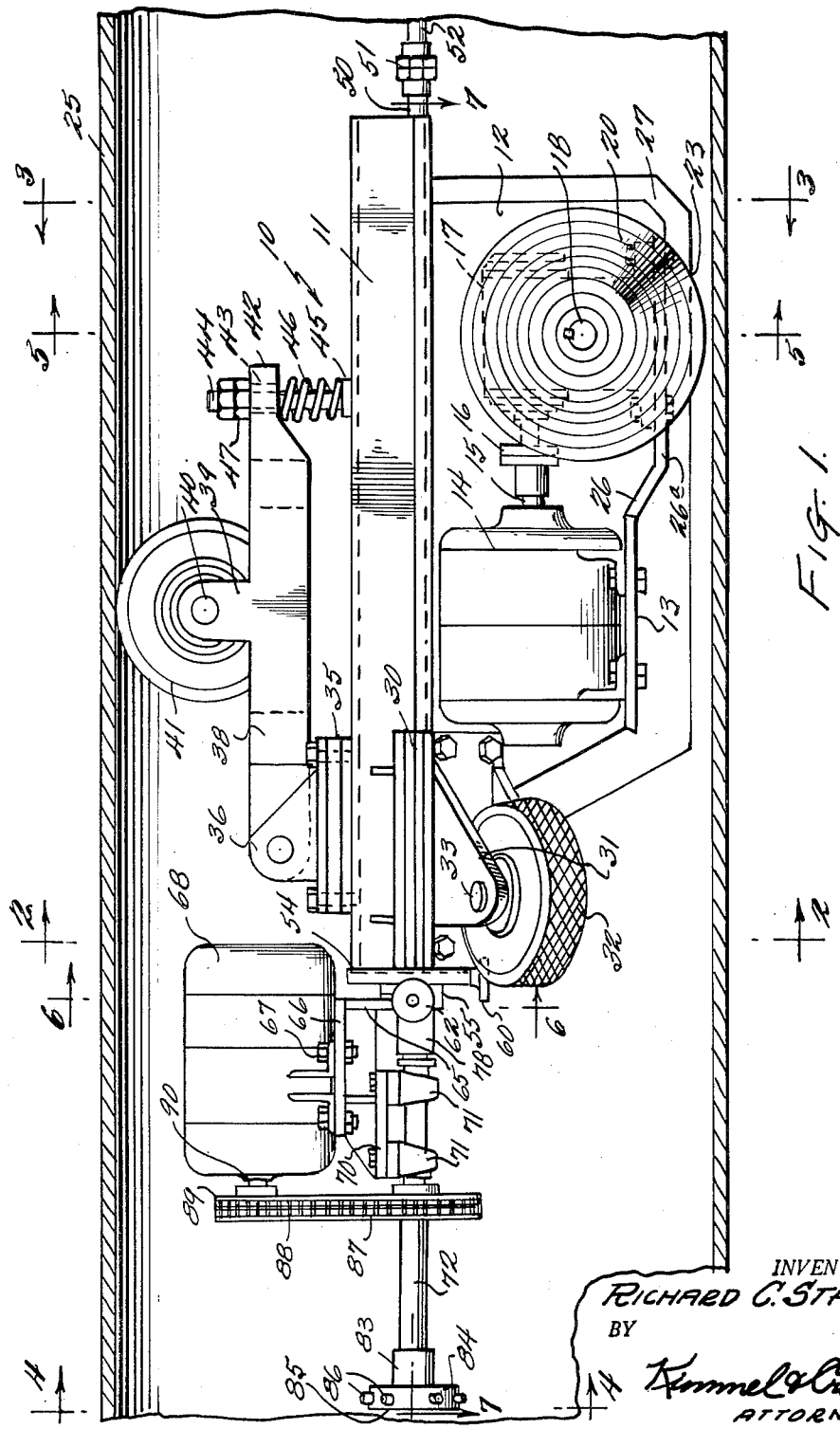
FIGURE 1 is a side elevational view of one form of apparatus embodying the instant inventive concept shown as positioned interiorly of a pipe to be coated.
Figure 2:
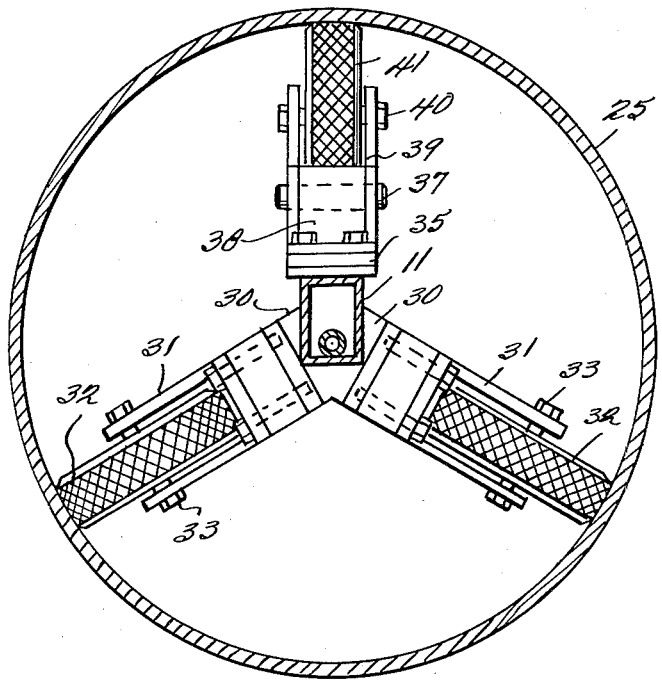
FIGURE 2 is a sectional view taken substantially along the line 2—2 of FIG. 1 as viewed in the direction indicated by the arrows.

Angularly disposed supporting members 30 are positioned on opposite sides of frame member 11 forwardly of motor 14, and carry spaced brackets 31, the brackets being bifurcated, and provided with pneumatic tired wheels 32, mounted on axles 33 extending between the bifurcations. As best shown in FIG. 2, the lower wheels 32 are disposed in angular relation to each other and engage opposite sides of the pipe 25.

A top plate 35 is mounted on the top of frame member 11, and supports a pair of upstanding brackets 36, between which extends a pivot pin 37, which carries an arm 38. The arm 38 is provided with a pair of intermediately positioned upstanding lugs 39, between which extends an axle 40, which carries a pneumatically tired wheel 41, similar to the wheels 32, and which engages the top of the pipe 25. The end 42 of pivoted bar 38 beyond the wheel 41 is provided with an opening 43, through which extends a bolt 44, the lower end 45 of which is secured at the top of frame member 11. A relatively heavy duty cushioning spring 46 is interposed between the head of the bolt and the underside of the end 42 of arm 38 to provide a cushioning resilient effect, and also to compensate for minor inaccuracies in size in the interior of the pipe. Locking nuts 47 serve to permit minor adjustment of the relative position of the end 42 of arm 38 and vary the compression of spring 46.

A paint feed line 50 extends through the frame member 11, and is secured as by a fitting 51 to a flexible hose 52, which extends from any desired source of paint. The opposite end of the tube extends outwardly through the end of frame member 11, which end is provided with a plate 53, having oppositely positioned vertical channel members 54 thereon, within which is movable a plate 55, having an opening therein which surrounds the pipe 50. The plate 55 extends transversely across the channel members 54 and plate 53 and is provided in turn with a pair of horizontally disposed channel members 56, within which is movably mounted a plate 57. The plate 57 is provided with a central opening 58, through which the end of the pipe 50 extends. A set screw 60 extends through a suitable threaded aperture and a cross member 61 at the lower end of channels 54, and by movement of the plate 55, may vary the vertical position of the tube or pipe 50.

A similar set screw 62 extends through a threaded opening and a cross member 63, which extends between the ends of the channels 56, and has its end engaging the plate 57, the arrangement being such that rotation of the knurled end of the set screw 62 varies the horizontal position of the end of the pipe 50 so that the pipe may be accurately centered both horizontally and vertically relative to the pipe 25.

Figure 7:
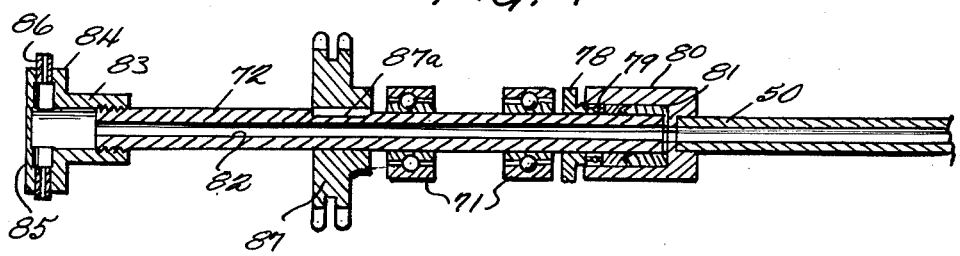
FIGURE 7 is a longitudinal sectional view taken substantially along the line 7—7 of FIG. 1, certain parts being omitted.

The plate 57 has securely bolted thereto a bracket 65, which carries a horizontal plate 66, to which is bolted as by means of bolts 67 a second electric motor 68. A depending bracket 69 secured to the plate 66 has bolted thereto a bearing plate 70, from which depend a pair of spaced bearings 71, within which is rotatably mounted a pipe extension 72. As best shown in FIG. 7, the extension 72 is provided with a bushing 78, which carries a bearing 79, which is rotatably mounted in a cup 80 affixed to the end of pipe 50. Suitable packing 81 is provided in order to insure a fluid tight seal for the rotatable member 72 relative to the pipe 50. Rotatable member 72 is provided with a bore 82 in alignment with the interior of pipe 50 to provide a free and unimpeded passage for paint or similar fluid therethrough. Pipe 72 has a fitting 83 threaded on the end thereof, the fitting 83 including a circular flange 84 with a closed end 85. Flange 84 is provided with a plurality of radially extending nozzles 86, for the diffusion of paint about the interior of the pipe 25. Relatively high speed rotation of the nozzles 86 is effected by means of a sprocket 87 which is mounted on the tubular member 72 and keyed thereto as by means of a key 87a. The sprocket 87 is driven by means of a belt or chain 88 from a sprocket 89 which is carried by the drive shaft 90 of the motor 68. Current is supplied to the motors 68 and 14 in any suitable conventional manner, as by a suitable wire which may extend from the end of the pipe interiorly of the frame member 11.

It is to be noted that the motor 14 is reversible, in order that the apparatus may be driven in either direction and may be controlled from a suitable remote point exteriorly of the pipe 25.

From the foregoing the use and operation of the device should now be readily understandable. The apparatus 10 is inserted in the end of a pipe to be painted, and the motor 14 started and switched to the position to energize the rollers 20 to drive the apparatus forwardly through the pipe to approximately the far end thereof. At this time when the nozzles 86 project very slightly from the end of the pipe, or just at the interior thereof, the motor 14 is reversed to reverse the direction of drive and the motor 68 started. At the same time paint is fed through the pipe 50 under relatively high pressure, from an exteriorly positioned pump, and the motor 68 is started to rotate the nozzle assembly. The device is then backed through the pipe at a desired rate of speed, with the nozzle rotating to impart a relatively heavy even coat of paint or the like throughout the entire interior of the pipe. The slides may be adjusted by means of the screws 60 and 62 upon entry of the assembly into the pipe, in order to be sure that the nozzle is centered, and thus insure an even coating throughout the interior of the pipe.

From the foregoing it will now be seen that there is herein provided an improved apparatus for painting or coating the interior of pipes which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. An apparatus for coating the interior of pipes comprising a main frame, a reversible motor carried by said main frame, a pair of tapered arcuate resilient drive rollers supported by said frame and driven by said motor, a nozzle rotatably mounted on one end of said frame, a second motor for rotating said nozzle, a paint supply tube extending through said frame for supplying paint to said nozzle, means operative to move said nozzle vertically and horizontally to center said nozzle in the pipe to be coated, and supplemental guide wheels carried by said main frame, and extending radially therefrom adapted to contact the sides of the pipe to be painted.

2. An apparatus for coating the interior of pipes comprising a main frame, a reversible motor carried by said main frame, a pair of tapered arcuate resilient drive rollers supported by said frame and driven by said motor, a nozzle rotatably mounted on one end of said frame, a second motor carried by said main frame for rotating said nozzle, a paint supply tube extending through said frame for supplying paint to said nozzle, means operative to move said nozzle vertically and horizontally to center said nozzle in the pipe to be coated, and supplemental guide wheels carried by said main frame, and extending radially therefrom adapted to contact the sides of the pipe to be painted, at least one of said wheels being resiliently mounted on said frame.

3. The structure of claim 1 wherein the means for adjusting said nozzle comprise a pair of spaced parallel channels carried by the end of said main frame, a plate movably mounted in said channels, a second pair of spaced parallel channels extending in perpendicular relation to said first-mentioned pair of channels carried by said plate, a second plate mounted in said second pair of channels, said first and second plates each having portions defining an opening therein through which said nozzle extends, and a set screw for moving said first plate in said first-mentioned pair of channels, and additional set screw means for moving said second plate in said second mentioned pair of channels.

References Cited in the file of this patent

UNITED STATES PATENTS

| | | |
|---|---|---|
| 1,971,535 | Perkins | Aug. 28, 1934 |
| 2,099,346 | Perkins | Nov. 16, 1937 |
| 2,140,298 | Miller | Dec. 13, 1938 |
| 2,326,822 | Brend | Aug. 17, 1943 |
| 2,461,517 | Carnevale | Feb. 15, 1949 |
| 2,698,449 | Rafferty | Jan. 4, 1955 |
| 2,800,875 | Jewell | July 30, 1957 |
| 2,859,728 | Hobdy | Nov. 11, 1958 |
| 2,865,321 | Von Arx | Dec. 23, 1958 |